Jan. 30, 1923.

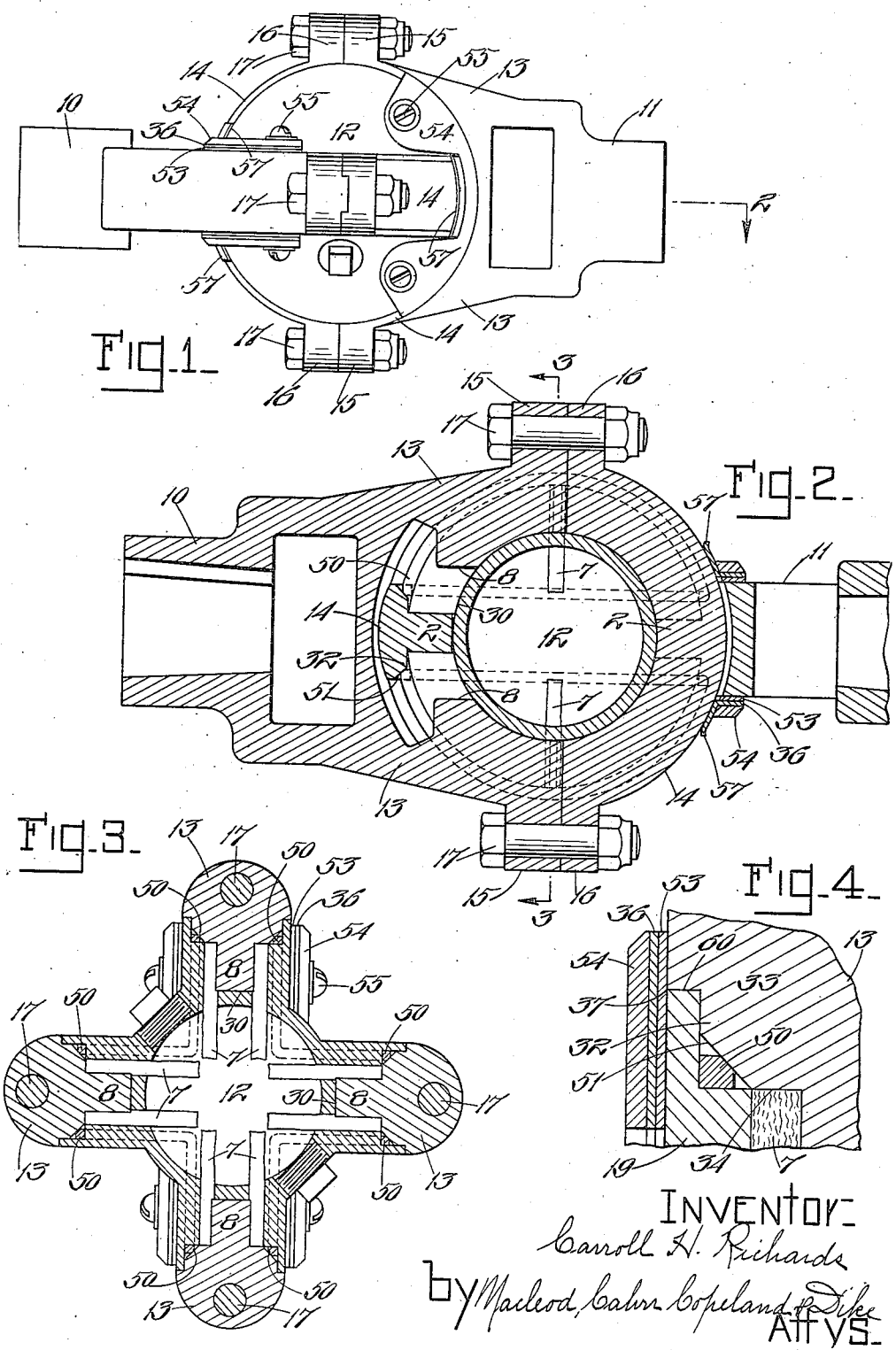

C. H. RICHARDS.
UNIVERSAL JOINT.
FILED NOV. 12, 1920.

INVENTOR:
Carroll H. Richards
By Macleod Calm Copeland & Dike
Attys.

Patented Jan. 30, 1923.

1,443,930

UNITED STATES PATENT OFFICE.

CARROLL H. RICHARDS, OF NEWTON, MASSACHUSETTS.

UNIVERSAL JOINT.

Application filed November 12, 1920. Serial No. 423,760.

*To all whom it may concern:*

Be it known that I, CARROLL H. RICHARDS, a citizen of the United States, residing at Newton, county of Middlesex, State of Massachusetts, have invented a certain new and useful Improvement in Universal Joints, of which the following is a specification, reference being had therein to the accompanying drawings.

The invention relates to new and useful improvements in universal joints. It relates especially to that class of universal joints which are employed to connect two shafts. The present invention is an improvement on the device shown and described in an application for Letters Patent, filed by me June 24, 1920, Serial No. 391,500. In the device shown and described in said application the joint comprises two bifurcated elements, said spherical element being made hollow and used also as an oil reservoir for lubrication of the rubbing surfaces.

One object of the invention set forth in said prior application was to provide means for preventing too free discharge of oil from the ball reservoir while still utilizing the centrifugal force in part to feed the oil. The means for accomplishing this object was by the use of wicks in the form of plugs inserted in apertures leading from the ball reservoir to slowly feed the oil, and also by making the oil passage take an angular course to aid somewhat in checking the force of the discharge. One object of the present invention is to provide still additional means for checking the discharge of the oil or other lubricant, and consists in the employment of a check valve of flexible material, in combination with a supporting flange on the ball.

Another object of said previous invention was to provide a dust cover to prevent the entrance of dust in between the rubbing surfaces of the joint, and one feature of the present invention consists of an improvement upon the dust protector shown in said application.

The invention will be fully understood from the following description when taken in connection with the accompanying drawings, and the novel features thereof will be pointed out and clearly defined in the claims at the close of this specification.

In the drawings, Fig. 1 is a view of a universal joint embodying the invention.

Fig. 2 is a section on line 2 of Fig. 1.

Fig. 3 is a section on line 3—3 of Fig. 2.

Fig. 4 is a detail sectional view to show the check valve installed in the joint.

Figure 5:
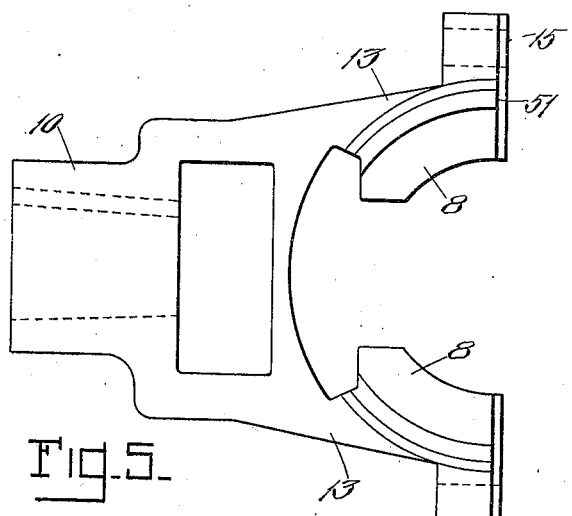
Fig. 5 is a plan view of one of the fork members.
Figure 6:
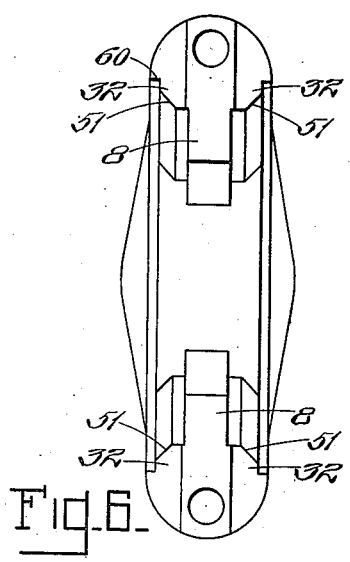
Fig. 6 is an end view of the fork shown in Fig. 5.

Referring now to the drawings, 10 and 11 represent the shanks of the two bifurcated coupling elements, and 12 the spherical oil containing element with which said bifurcated elements are connected. Each of the two shank members 10—11 is constructed for engagement with contiguous ends of two shafts (not shown) which are to be connected together by the joint. The two coupling elements 10—11 are duplicates of each other and are connected in like manner with the hollow sphere or ball 12, but the jaws of one coupling element lie in a plane at an angle of 90° from the plane in which the jaws of the other coupling element lie; that is, if the jaws of one element are in a vertical plane, the jaws of the other element are in a horizontal plane, but the axis of each is in line with its respective shaft, so that if the axes of the two shafts are in the same straight line then the axes of the two coupling elements will be in the same straight line, and if the axes of the shafts are at an angle to each other then the axes of the shanks of the coupling elements will be at an angle to each other, but the planes of the two sets of jaws will always be maintained at right angles to each other.

The coupling elements 10 and 11 are each formed with two similar jaws 13—13, each having an inner periphery on an arc of a circle, and the outer ends of said two jaws 13—13 are connected by a semi-circular strap 14 whose inner periphery combines with the inner periphery of the two jaws 13—13 to encircle the ball 12. The jaws 13—13 are formed respectively with lugs 15—15 at the outer ends, and the strap 14 is formed with lugs 16—16 at its ends whose faces engage the faces of the lugs 15—15 respectively. The said lugs are formed with bolt holes, so that the strap may be detachably connected with the jaws by bolts 17.

The combined jaws and strap have a tongue and groove connection with the ball 12 by a sliding fit. The preferred form is to provide the ball with grooves and to provide the jaws and strap with tongues.

In the form shown in the drawings, the jaws 13 are each formed with a tongue 8 on an arc of a circle concentric with the periphery of the ball, and the ball is formed with parallel peripheral flanges 19—19 forming between them a groove 30 within which the tongues 8 have a sliding fit. The strap 14 is also formed with a tongue 2 which forms a sliding fit in the groove 30 formed between the flanges 19—19 of the ball.

Figure 7:
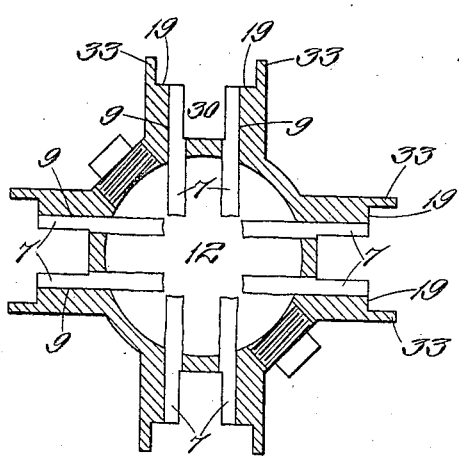
Fig. 7 is a sectional view of the ball.

The ball is formed with a plurality of apertures 9 which extend through the periphery of the ball and through the ribs or flanges 19—19. Said apertures where they pass through the flanges 19 cut through the inner face of the flange, as shown in Figure 7, thus forming a narrow slit through the walls of the flanges into the grooves 30 which are engaged by the tongues 2 and 8.

Wicks 7 are inserted compactly in these several apertures, the inner ends extending into the interior of the ball, as shown in the drawings, so that they dip into the lubricant within the ball and extend outward to the outer end of the flanges 19. Any suitable lubricant may be employed, but for convenience I refer to it as oil. The oil is slowly fed by the wicks.

As the centrifugal force during the rotation of the shaft and joint tends to throw the oil outwardly, if there were a straight passage between the members of the joint, even a crevice, directly outward from the end of the wick, the oil would be expelled from the joint and thus would escape through the joint in excessive quantities even with the use of the plugging wick. For this reason I provide an interrupted path for the oil after it leaves the wick.

In the preferred form of construction, the jaws 13 are each formed with flanges 32 on the two opposite faces of the tongues 8, these flanges being segments whose inner periphery 34 has a sliding fit over the periphery of the flanges 19 of the ball. The straps also are formed with flanges 32 whose inner peripheries fit the outer peripheries of the flanges 19 of the ball.

The flanges 32 of the jaws have beveled outer edges 51 and the flanges 32 of the straps also have beveled outer edges 51 corresponding with the beveled outer edges of the jaw flanges. The ball flanges 19 are formed with lips 33 which are thin radial extensions of the flange and engage a rabbeted shoulder 60 on the jaw, and a corresponding shoulder on the strap. I provide a check valve 50 which follows around the periphery of the flange 19 of the ball and is supported laterally by the peripheral lip 33 on the ball. This check valve lies upon the periphery of the segmental flange 19 and lies up against the said segmental lip 33 and is covered by the straps 14 and the jaws 13. The beveled outer edges 51 of the jaws and the straps together with the periphery of the flange 19 and the lip 33 form a triangular recess for the washer.

The member 50 is made of somewhat flexible material, preferably of leather, so that it may yield to the centrifugal force and be forced further radially outward into the three-cornered passageway formed by the beveled edge 51 of the lip 32, the periphery of the flange 19 and the side wall of the lip 33, also the pressure of the lubricant back of the member 50 further aids in seating the member 50, and said member 50 acts as a check valve.

Figure 8:
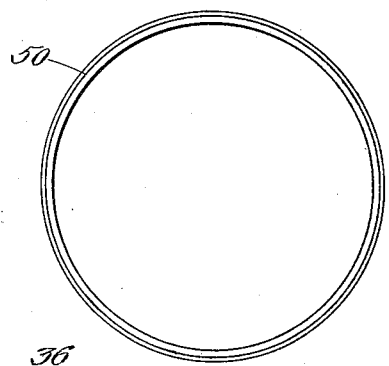
Fig. 8 is a detail view of the check valve in its open form before it is bent into right-angled form when assembled in the joint.
Figure 9:
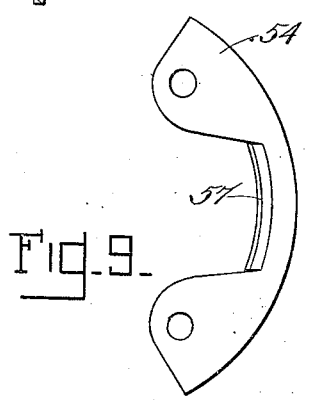
Fig. 9 is a plan view.
Figure 10:
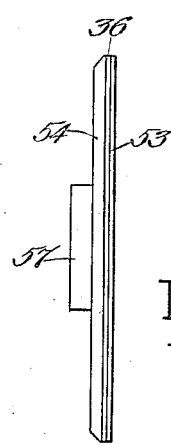
Fig. 10 is an edge view of one of the dust caps.

Preferably also the said washer is made in the form of a ring as shown in Figure 8, which is bent diametrically at right angles into two planes, as will be seen in Figure 3, so that the same check valve will be continuous for two of the segmental flanges on the ball in planes at right angles to each other.

As the oil is slowly fed through the wick to the side faces of the tongues 8 of the jaws and corresponding tongues 2 of the straps, and to the thin crevices between the periphery of the ball flanges and the shoulders 60 on the jaws and straps, the member 50 will check or prevent its escaping out over the lip 33 of the ball flange.

To protect the joint against the entrance of dust, I provide dust plates or covers which are secured to the flanges 19 of the ball to cover the crevices 37 between the flange lips 33 of the ball and the side faces of the jaws and the cooperating strap where it runs under the arch of the dust cap. Preferably the dust covers are each formed of a segmental disk 36 of leather or other suitable flexible material clamped between two clamping members 53, 54, the combined three members 36, 53 and 54 being secured by screws 55 screwed into holes in the flange 19 of the ball. The inner clamping member 53 covers the crevice 37 between the jaws and the flange lips 33 of the ball. This member 53 is preferably of some thin sheet metal, for instance, steel. The outer clamping member 54 should be thicker and more rigid, and may be of any suitable material, hard fibre being preferable.

The flexible intermediate protector 36 is cut so as to form a tongue 57 which extends laterally outward underneath the arch portion of the outer clamp 54 and laps onto the outer periphery of the strap. When the ball rotates, the said tongue 57 of the flexible dust cap will wipe over the periphery of the strap and wipe off the dust which may have collected thereon.

What I claim is:—

1. A universal joint having two coupling elements for connection respectively with two shafts, an intermediate hollow spherical member to contain a lubricant, each coupling element having two jaws and a cooperating strap member which have a tongue and groove engagement with the spherical member, means for feeding a lubricant from the spherical member, the spherical member being formed with peripheral flanges in pairs which form a groove for the reception of the tongues of the jaws and straps, said flanges being formed with peripheral lips which extend radially beyond said flanges, and a flexible member which lies upon the periphery of said flange and against the inner face of said lip to form a check valve, the jaws and the straps being formed with beveled faces which cooperate with the flange and the lip to form a passageway for the said flexible member.

2. A universal joint having two coupling elements for connection respectively with two shafts, an intermediate hollow spherical member to contain a lubricant, each coupling element having two jaws and a cooperating strap member which together encircle the spherical member and have a tongue and groove engagement with the spherical member, means for feeding a lubricant from the spherical member, the spherical member being formed with peripheral flanges in pairs which form grooves for the reception of the tongues of the jaws and straps, said flanges being formed with peripheral lips which extend radially beyond said flanges, and a flexible member which lies upon the periphery of said flange and against the inner face of said lip to form a check valve, the jaws and the straps being formed with beveled faces which cooperate with the flange and the lip to form a passageway for the said washer, said flexible member being of annular formation bent diametrically to form two semi-circular portions in planes at right angles to each other, and forming a continuous check valve for two pairs of the flanges at right angles to each other.

3. A universal joint having two coupling elements for connection respectively with two shafts, an intermediate hollow spherical member to contain a lubricant, each coupling element having two jaws and a cooperating strap member which together encircle the spherical member and have a tongue and groove engagement with the spherical member, means for feeding lubricant from the spherical member, the spherical member being formed with peripheral flanges in pairs which form grooves for the reception of the tongues of the jaws and straps, said flanges being formed with peripheral lips which extend radially beyond said flanges, said lips being formed with transverse notches to receive the jaw strap which crosses it at right angles, a segmental dust shield which is slotted to bridge over the strap and laps over onto the flange of the spherical member and is secured thereto, said dust shield having a flexible tongue portion which projects laterally outward from beneath the bridging portion of the dust shield and wipes over the periphery of the said strap.

4. A universal joint having two coupling elements for connection respectively with two shafts, an intermediate hollow spherical member to contain a lubricant, each coupling element having two jaws and a cooperating strap member which together encircle the spherical member and have a tongue and groove engagement with the spherical member, means for feeding a lubricant from the spherical member, the spherical member being formed with peripheral flanges in pairs which form grooves for the reception of the tongues of the jaws and straps, said flanges being formed with peripheral lips which extend radially beyond said flanges, said lips being formed with transverse notches to receive the jaw strap which crosses it at right angles, a segmental dust shield which is slotted to bridge over the strap and laps over onto the flange of the spherical member and is secured thereto, said dust shield having a flexible tongue portion which projects laterally outward from beneath the bridging portion of the dust shield and wipes over the periphery of the said strap, in combination with a pair of segmental members between which the said flexible member is clamped.

5. A universal joint having two coupling elements for connection respectively with two shafts, an intermediate hollow spherical member to contain a lubricant, each coupling element having two jaws and a cooperating strap member which have a tongue and groove engagement with the spherical member, means for feeding a lubricant from the spherical member, the spherical member being formed with flanges which form grooves for the reception of the tongues of the jaws and straps, said flanges being formed with peripheral lips which extend radially beyond said flanges, and a washer of flexible material which lies between said lips and the jaws and between the said lips and the straps.

6. A universal joint having two coupling elements for connection respectively with two shafts, an intermediate hollow spherical member to contain a lubricant, each coupling element having two jaws and a cooperating strap member which have a tongue and groove engagement with the spherical member, means for feeding a lubricant from the spherical member, the spherical member being formed with flanges which form grooves for the reception of the tongues of the jaws and straps, said flanges being formed with peripheral lips which extend radially beyond said flanges, and a flexible member which lies between said lips and the jaws and between the said lips and the straps to form a check valve, the jaws and straps and the flanges of the ball being so constructed as to form a passageway for the reception of the said flexible member.

7. A universal joint having two coupling elements for connection respectively with two shafts, an intermediate hollow spherical member to contain a lubricant, each coupling element having two jaws and a cooperating strap member which have a tongue and groove engagement with the spherical member, means for feeding a lubricant from the spherical member, the spherical member being formed with peripheral flanges, a flexible member located on the periphery of said flanges to form a check valve, the flanges, jaws and the straps being so constructed with relation to each other as to form a passageway for the flexible member, whereby said flexible member lies between said jaws and straps and said flanges on the spherical member.

8. A universal joint comprising a spherical hollow member for holding a lubricant, two coupling elements for connection respectively with two shafts, each coupling element having two jaws and a cooperating strap which encircle the spherical member in planes at right angles to each other, tongue and groove connections between the spherical member and the jaw and strap members, means whereby the lubricant may be fed from the spherical member to the encircling members and a flexible member in the joints between the said spherical member and the encircling members.

9. A universal joint comprising a spherical hollow member for containing a lubricant, two coupling elements for connection respectively with two shafts, each coupling element having a pair of jaw members and a cooperating strap encircling the spherical member, the jaw members and straps of the two coupling members being in planes at right angles to each other, segmental tongue and groove connections between the spherical member and the jaw and strap members, said tongue and groove connections being radial to the spherical member, means for feeding the lubricant from the spherical member to the encircling members, and a flexible annular member bent diametrically into two semi-circular portions in planes at right angles to each other, and forming a continuous check valve between two sets of said connections between the spherical member and the jaws and straps.

10. A universal joint comprising a spherical lubricant holder, two coupling elements for connection respectively with two shafts and having radial flange connections with said spherical member, the flange connections of one of the coupling members being in planes at right angles to the planes of the flange connection with the other coupling member, means whereby the lubricant is capable of being fed from the interior of the spherical member to the engaging connections with the coupling members, and an annular flexible member bent diametrically to form two semi-circular portions in planes at right angles to each other, which form a continuous check valve for portions of said spherical and coupling members which lie in planes at right angles to each other.

11. A universal joint having two coupling elements and a cooperating, intermediate lubricant holder, said coupling elements and lubricant holder having tongue-and-groove connections with each other, a washer between the adjacent surfaces of the tongue-and-groove engaging portions, and means whereby the lubricant may be fed to the adjacent surfaces of said interengaging portions.

12. A universal joint having two coupling elements and a cooperating, intermediate lubricant holder, each of said coupling elements having jaws which have a tongue-and-groove engagement with the periphery of said lubricant holder, in such manner that the tongue has a sliding movement in the groove, a washer between the adjacent surfaces of the tongue-and-groove engaging portions, and means whereby lubricant may be fed from the holder to the said adjacent surfaces.

13. A universal joint having two coupling elements and a cooperating, intermediate lubricant holder, each of said coupling elements having members which encircle the lubricant holder and have a tongue-and-groove engagement therewith, a washer between the adjacent surfaces of the tongue-and-groove engaging portions, and means whereby lubricant may be fed from the holder to the said adjacent surfaces.

In testimony whereof I affix my signature.

CARROLL H. RICHARDS.